United States Patent [19]

Head et al.

[11] Patent Number: 5,403,155
[45] Date of Patent: Apr. 4, 1995

[54] POWER MANAGEMENT FOR A TURBINE POWERED HELICOPTER

[75] Inventors: Robert E. Head, Tempe; Channing S. Morse, Mesa; Thomas G. Ashe, Apache Junction, all of Ariz.

[73] Assignee: McDonnell Douglas Helicopter Company, Mesa, Ariz.

[21] Appl. No.: 169,616

[22] Filed: Dec. 17, 1993

[51] Int. Cl.6 ............................................. B64C 13/04
[52] U.S. Cl. ........................................ 416/25; 74/523; 74/527; 244/197; 244/236
[58] Field of Search ................... 416/25, 27; 74/527, 74/523; 244/197, 234, 236

[56] References Cited

U.S. PATENT DOCUMENTS

| | | | |
|---|---|---|---|
| 2,855,054 | 10/1958 | Morgan et al. | 416/25 |
| 3,820,323 | 6/1974 | Burnell et al. | |
| 4,077,203 | 3/1978 | Burnell . | |
| 4,134,560 | 1/1979 | Messerschmidt | 244/83 F |
| 4,142,364 | 3/1979 | Wanger . | |
| 4,191,065 | 3/1980 | Golobay et al. | 74/489 |
| 4,222,474 | 9/1980 | Choudhury et al. | 74/523 |
| 4,232,565 | 11/1980 | Leonheart | 74/489 |
| 4,302,931 | 12/1981 | White et al. . | |
| 4,337,053 | 6/1982 | Stevens . | |
| 4,344,281 | 8/1982 | Schuster et al. . | |
| 4,345,195 | 8/1982 | Griffith et al. | 318/628 X |
| 4,362,067 | 12/1982 | Earl et al. . | |
| 4,364,283 | 12/1982 | Ricardo . | |
| 4,368,618 | 1/1983 | Nave . | |
| 4,478,038 | 10/1984 | Cropper et al. . | |
| 4,537,025 | 8/1985 | Cropper et al. . | |
| 4,667,909 | 5/1987 | Curci | 244/234 |
| 4,793,133 | 12/1988 | White et al. . | |
| 5,012,423 | 4/1991 | Osder | 364/432 |
| 5,156,363 | 10/1992 | Cizewski et al. | 244/236 |
| 5,188,316 | 2/1993 | Dressler et al. | 244/236 |

OTHER PUBLICATIONS

Eurocopter, EC135 Brochure, 02/92-021, pp. 42-03, 42-05, 62-18, 62-19, 62-20.

*Primary Examiner*—Edward K. Look
*Assistant Examiner*—Michael S. Lee
*Attorney, Agent, or Firm*—Donald E. Stout

[57] ABSTRACT

An engine control system for a helicopter having at least one engine is provided, including an electronic engine control unit for each engine and further including a manually operated system for backing up each electronic engine control unit in the event of a failure thereof or for permitting optional manual engine operation. The engine control system includes at least one collective pitch stick and at least one twist grip rotatably mounted on the collective pitch stick. Each twist grip includes a normal (NORM) position within the range of the operating arc which is coincident with a detent. The system includes means for electronically actuating the detent to retract when the twist grip is rotated out of the NORM position into a manual operating mode, so that the electronic disablement of the detent permits an operator to smoothly operate the twist grip through the operating arc when the engine control system is in a manual control mode. The twist grip further includes an additional arc of travel past the idle stop to an OFF position, wherein fuel flow to its corresponding engine is cut off. Significantly, the system includes an electrically actuated mechanical gate over which the twist grip must pass to enter or exit the OFF position. The gate is normally biased closed, and may be opened electrically by means of a pilot-actuated off release pushbutton to enter the OFF position, or may be opened mechanically by twisting the twist grip against the bias to exit the OFF position.

12 Claims, 2 Drawing Sheets

POWER MANAGEMENT FOR A TURBINE POWERED HELICOPTER

BACKGROUND OF THE INVENTION

This invention relates to an engine power management system for an aircraft, and more particularly to an electronic control system having a mechanical backup with particular advantageous features.

A recent advance in engine control technology for turbine engined light helicopters is the use of single channel Full Authority Digital Engine Control (FADEC) systems to automatically electronically control the fuel flow and engine speed throughout the entire flight regime. Such controls easily enable a single pilot to manage the complex task of flying a helicopter with one hand with a high degree of safety and reliability. However, on occasion such electronic systems fail, or for some other reason it is desirable to operate the engine or engines under manual control. Accordingly, it has recently become known to employ a manual backup system for electively controlling the helicopter engine, which is activated by means of twist grips rotationally affixed to the collective pitch stick. Such an advantageous arrangement enables the pilot to operate the engine controls with one hand (preferably the left hand) and to not have to perform contortions with both hands to start, stop, and operate the engines during flight, all while keeping the left hand on the collective pitch stick and the right hand on the cyclic pitch stick. The arrangement also keeps the pilot's hands on the control sticks in flight, and requires only a short movement of the left hand away from the collective stick to start or stop the engine at the beginning and end of a flight. Full engine control is enabled in either the fully automatic mode or the manually controlled backup mode.

The twist grips which have been employed in prior art systems have an arc of travel which includes an OFF position, a range in which the engine is under manual control, an IDLE position, and a full open position in which the engine is under automatic control. To take manual control of the engine under that scheme, the pilot must retard must retard the twist grip (or Power Lever) to the IDLE position, remove his/her hand from the collective control stick, reach to the console to operate an automatic-to-manual switch, reach back again to the twist grip, and then advance the twist grip to achieve the desired engine power.

SUMMARY OF THE INVENTION

This invention provides an engine control system for a rotorcraft having at least one engine, and preferably two, wherein the engine control system includes an electronic engine control unit for each engine and further includes a manually operated system for backing up each electronic engine control unit in the event of a failure thereof or for permitting optional manual engine operation. The engine control system includes at least one collective pitch stick and at least one twist grip rotatably mounted on the collective pitch stick. The number of twist grips is equal to the number of engines and the twist grips are arranged to control a corresponding engine. Each twist grip includes a normal (NORM) position within the range of its operating arc which is coincident with a detent.

Rotating the twist grip from the normal position, in either direction, switches the engine into manual control while increasing or decreasing the fuel flow, as desired.

An important feature of the detent is that it is spring loaded, and the system includes means for electronically actuating the detent to retract it when the twist grip is rotated out of the NORM position into a manual operating mode, so that the electronic disablement of the detent permits the pilot to smoothly operate the twist grip throughout the operating arc when the engine control system is in a manual control mode.

Another important aspect of the invention is that the twist grip further includes an additional arc of travel past the IDLE stop, to an OFF position, wherein fuel flow to the corresponding engine is cut off. Significantly, the system includes an electrically actuated mechanical gate over which the twist grip must pass to enter or exit the OFF position. The gate is normally spring-biased closed and may be opened electrically by means of a pilot-actuated OFF RELEASE pushbutton on the collective pitch stick to enter the OFF position, or may be opened mechanically by twisting the twist grip against the spring bias to exit the OFF position.

The most important feature of this invention is that the pilot never needs to remove his/her hand from the collective pitch stick to operate the engines in flight.

The invention, together with additional features and the advantages thereof, may best be understood by reference to the following description taken in connection with the accompanying illustrative drawings.

DETAILED DESCRIPTION OF THE INVENTION

Figure 1:
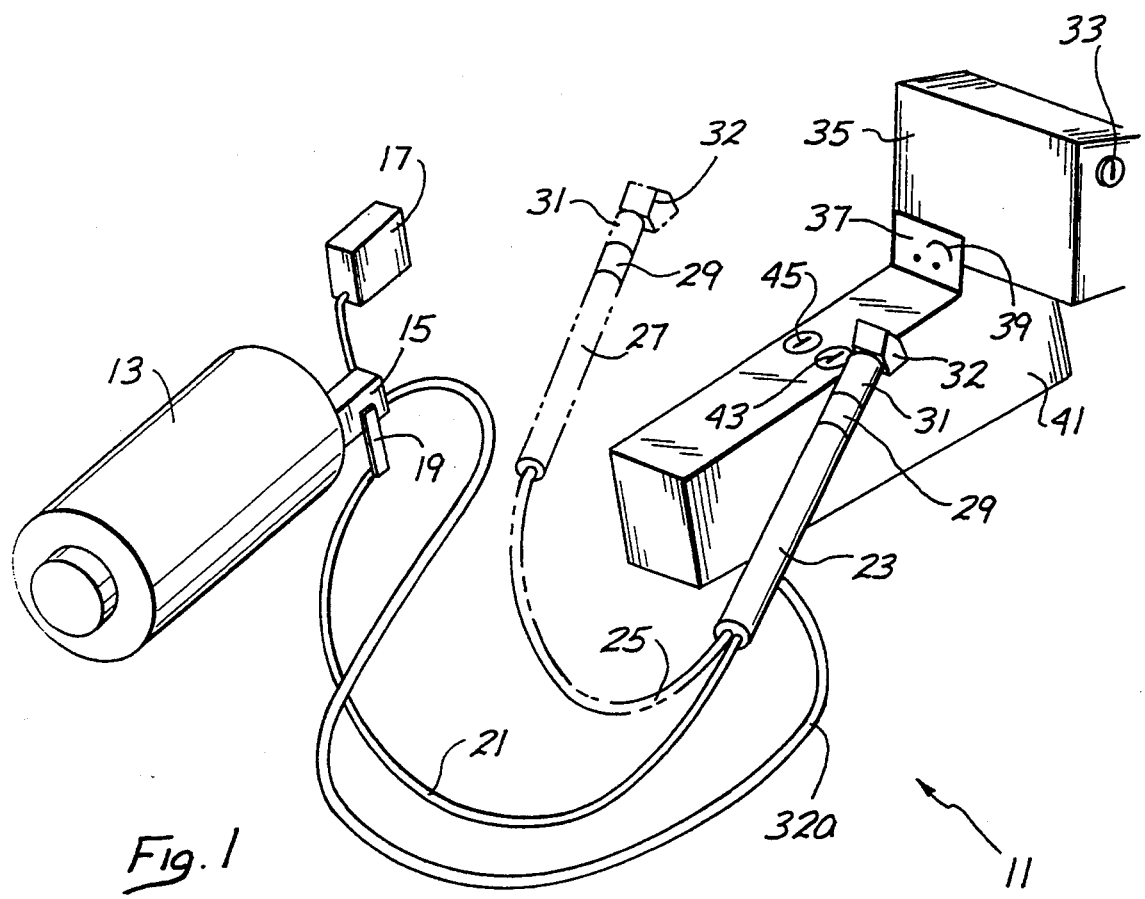
FIG. 1 is a perspective schematic view illustrating the components of the inventive system.

Referring now particularly to FIG. 1, a schematic representation of the inventive engine power management system 11 is shown. The system 11 includes one or more engines 13. In the preferred embodiment, the system 11 is employed in a light utility helicopter such as the MD EXPLORER ™ helicopter manufactured by McDonnell Douglas Helicopter Company, Inc. of Mesa, Ariz., and includes a pair of engines 13 manufactured by Pratt & Whitney, Canada, Ltd. (engine model P&WC 206A). The engine 13 is of a two-spool configuration which drives through a reduction gearbox to power the helicopter's transmission. The described system, however, could serve equally well in any other turboshaft-powered helicopter, single or multi-engined, whose engines have a primary electronic control and a manual backup.

The power management system 11 comprises a means for operating the engines 13, each of which is normally controlled by an engine electronic control unit, equipped with a manual backup.

Still with regard to FIG. 1, a fuel metering unit (FMU) 15 is mounted on the accessory gearcase of each engine 13, to provide metered fuel to the engine's combustor. An engine electronic control (EEC) 17 comprises a component of the system 11, and is preferably mounted remotely from the engine 13 to be in a more benign temperature environment. Both the FMU 15 and the EEC 17 are typically furnished with the engine 13 by the engine manufacturer. The FMU 15 has a power lever 19 mounted operatively thereon, which is connected by means of a manual interconnection 21 to a collective pitch stick 23, which in turn may be connected by means of a second manual interconnection 25 to a second collective pitch stick 27, so that both the pilot and co-pilot may control the operation of the craft independently. Rotatably mounted on each collective pitch stick 25 and 27 are a pair of twist grips 29 and 31, one of which controls each of the pair of engines 13 in the event that an engine's associated EEC 17 becomes inoperative, or if manual control of the engines 13 is desirable, in a manner to be described hereinbelow. Of course, the number of twist grips varies according to the number of engines employed in the aircraft. In addition to the twist grips, attached to each collective pitch stick is a switch module 32.

An electric interconnect system 32a also interconnects the collective pitch stick mechanisms 23 and 27 to the fuel metering unit 15. The electric interconnect system 32a serves to input signals from the collective stick position to the fuel control unit to adjust engine power in anticipation of imminent changes in response to the collective stick motions.

The aircraft is further equipped with a key-lock START/ENABLE switch 33, mounted on an instrument panel 35, which admits power to the engines' starters and ignition systems. Included on the instrument panel 35 is an instrumentation system 37, which preferably comprises an integrated instrument display system, and a pair of master caution warning lights 39. Beneath and adjacent to the instrument panel 35 is a console 41, on which are positioned a pair of power management switches 43 and 45, each of which controls one of the engines 13.

Figure 2:
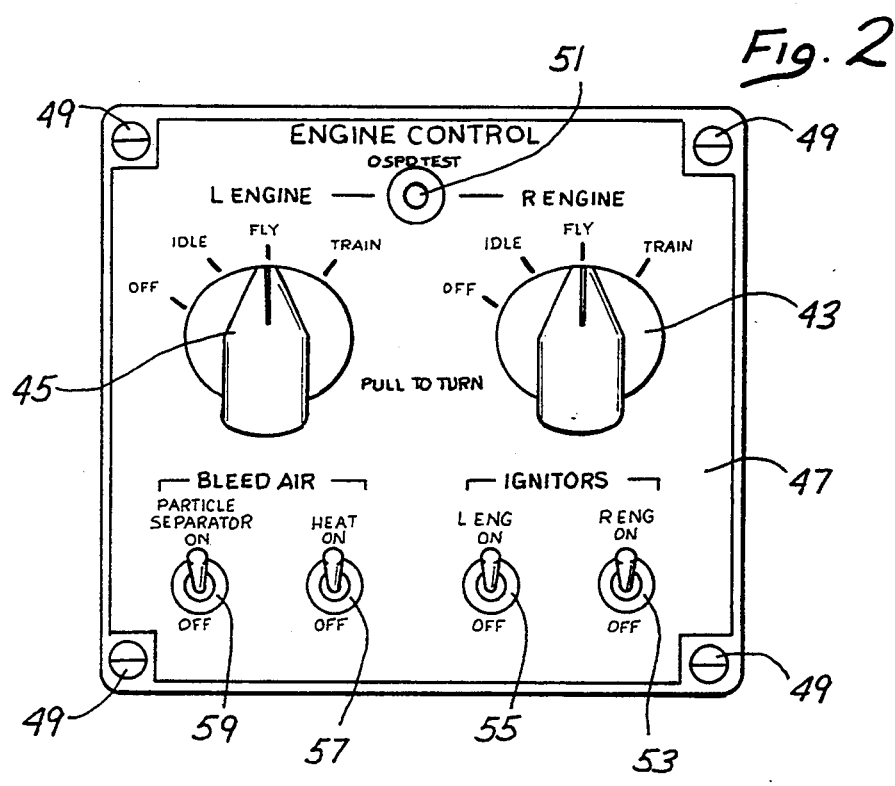
FIG. 2 is an elevational plan view of a console switch panel forming a part of the inventive system.

Referring now to FIG. 2, the power management switches 43 and 45, are shown in greater detail. The console 41 is positioned between the two pilots' seats, and includes a console instrument panel 47 mounted thereon by means of screws 49. On the instrument panel are various engine controls, including the switches 43 and 45. These power management switches are preferably rotary switches which control the EEC 17 and permit the pilot or co-pilot to select OFF, IDLE, FLY, or TRAIN. The power turbine speed (NPT) for IDLE is set by the main rotor's ground idle speed requirement (approximately 65% for the MD EXPLORER helicopter). In the FLY position the EEC controls the engine at 100% NPT for normal flight. The purpose of the TRAIN function is for training in simulated one-engine-inoperative flight. Each switch 43 and 45 has gates between each of its four positions which are passed by lifting the switch handle. The gates prevent inadvertent rotation of the switch.

Other controls which may optionally be included on the console instrument panel 47 include an overspeed protection device test switch 51, which preferably comprises a toggle switch, auxiliary engine ignition switches 53 and 55, and bleed air controls 57 and 59. The auxiliary ignitors 53 and 55 allow the pilot to use his or her discretion to select continuous ignition to prevent flameout during flight in heavy rain or snow. Additionally, if a pilot-operated torque-balancing function between the two engines were required, a trim potentiometer could be located on the console panel 47.

Figure 3:
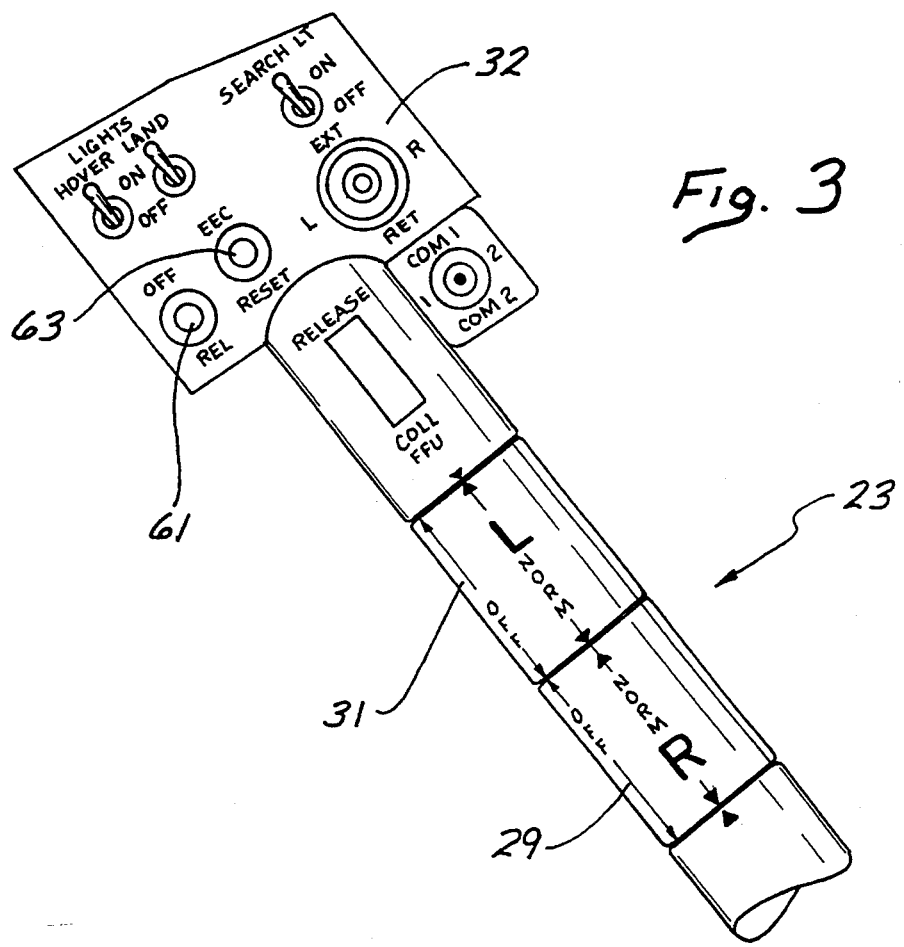
FIG. 3 is a plan view of the twist grips of the invention.

Now with reference particularly to FIG. 3, a fragmentary portion of one of the collective pitch sticks 23 is shown, including the two twist grips 29 and 31 and the switch module 32. The twist grips are so placed on the collective pitch sticks 23 and 27 so that the forward grip 31 operates the left engine and the aft grip 29 operates the right engine. Each grip rotates through an operating arc (preferably 112 degrees for the MD EXPLORER helicopter) from an idle stop to a maximum power position. When the twist grip 29 or 31 is twisted all the way clockwise, looking forward, the EEC 17 is off. There is an additional travel (preferably 53 degrees) past the idle stop position to the off position. Thus, there are three distinct positions within each twist grip's operating arc of travel:

IDLE: Mechanical stop with electric release (twist grip against the stop gate)

NORMAL: Centrally located spring detent with electric latch-open

MAXIMUM: Mechanical stop at the end of travel However, only about half of this travel (preferably about 68 degrees in the MD EXPLORER helicopter) is required to go from the minimum to the maximum fuel positions. This restricted range is located randomly within the operating arc that is available, depending on the power setting at the time that the shift to manual operation occurred.

The off position of each twist grip 29 or 31 is protected from accidental entry by an electrically actuated mechanical gate over which the twist grip must pass to enter or exit the off position. The gate is designed to be open whenever electric power is delivered to its actuating solenoid by an off release momentary pushbutton 61 shown in FIG. 3. The gate is normally spring loaded into the closed position. It is also designed so that it can be opened mechanically by twisting the twist grip out of the off position without the need for electrically opening the gate. The single off release pushbutton 61 opens the gates for both engines' twist grips 29 and 31. The solenoids for the gates are powered from the aircraft's battery bus.

Near the center of the twist grip's travel is a spring-loaded detent which is the normal (NORM) or RUN position in which the EEC 17 is in control of the engine. When the twist grip is twisted out of this NORM position (in either direction), the EEC 17 is disabled and the yellow caution lights 39 in the instrumentation system 37 are illuminated, indicating a steady EEC MAN condition. To return to normal EEC control after being in manual control, the pilot presses and releases an EEC reset pushbutton 63, which is located on the switch module 32. This releases the latch for the twist grip's NORM detent and returns the EEC to its normal operation. After releasing this pushbutton 63, the pilot returns the twist grip to its NORM position, which can be felt as the twist grip falls into the detent. Until the twist grip is returned to the NORM position, the lights 39 flash the EEC MAN indication. When the twist grip is back in the NORM detent, the instrumentation system 37 turns off the flashing EEC MAN mode indicator. The one EEC reset pushbutton 63 controls the reset function for both engines.

When either of the twist grips 29 or 31 are moved out of NORM to any position between the off gate and maximum power position, circuits for the engines starter and the ignition are enabled so that the engine may be started manually. When the twist grip is in the OFF position, the starter remains enabled but the ignition is disabled. This allows the engine to be "motored" for washing it or for blowing out unburned fuel.

The fuel system is controlled through a console-mounted panel (not shown). It contains a boost pump switch for each engine, a crossfeed valve switch, and a guarded switch for firewall shutoff to each engine.

The engine operating conditions are presented to the pilot through the instrumentation system 37. If selected by a key on the front face thereof, a "display-by-exception" presentation with only minimal information is shown to the pilot when all functions are going well. A test mode is available which will show all displays. When the EEC is in its manual mode, a yellow "EEC MAN." caution light 39 is displayed. If the EEC is functionally inoperative, a red "EEC FAIL" warning light 39 is displayed.

Figure 4:
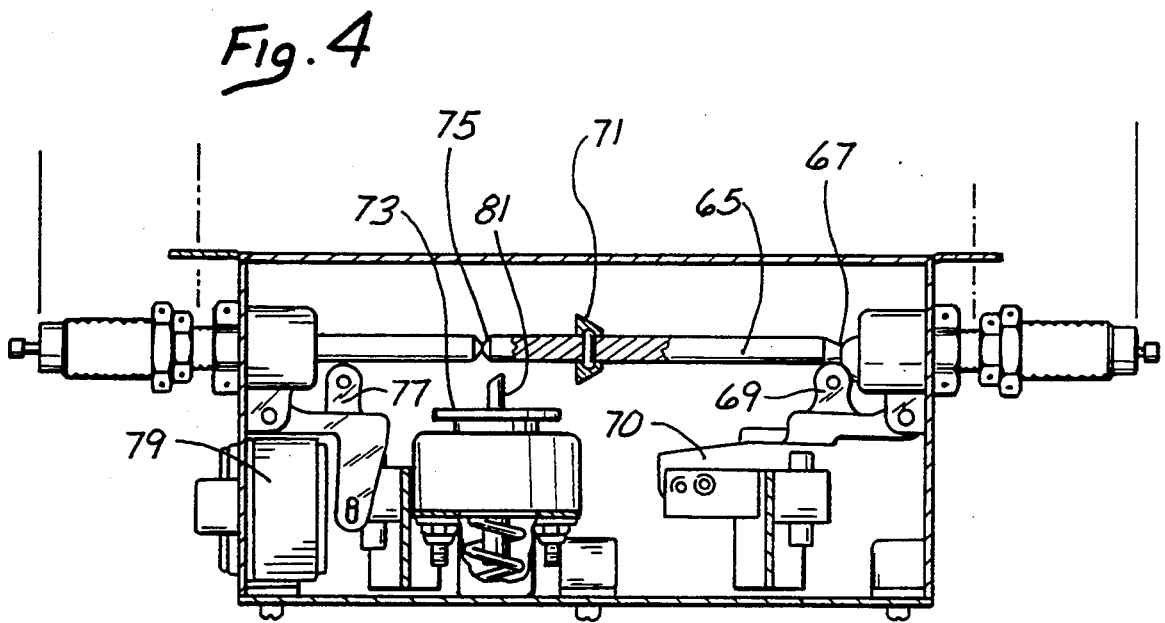
FIG. 4 is a diagrammatic elevation illustrating some of the mechanical and electronic interconnections between the twist grips and the engine fuel control of the inventive system.

FIG. 4 shows one preferred embodiment for effecting the conversion between automatic and manual fuel control. An actuation rod 65 obtains input at its left end from one of the twist grips 29 or 31 on the collective pitch stick 23 or 27, and provides output at its right end to the engine fuel control unit. Motion of the actuation rod 65 to the left reduces fuel flow, while motion to the right increases fuel flow. A detent notch 67 for the RUN condition maintains the actuation rod 65 in a motionless state while the engine is being controlled by the EEC 17. A detent follower 69 for the RUN condition is spring loaded against the actuation rod 65. Not shown is a solenoid to retract the detent follower 69. A microswitch 70 operates the RUN detent solenoid to disable the detent and to operate the FADEC for automatic or manual operation. The off gate collar is shown as element 71, while element 73 comprises the off gate release solenoid, which is spring loaded in the up position. The embodiment includes a detent 75 for the OFF condition, as well as a detent follower 77 for the OFF condition, which is spring loaded against the actuation rod 65. Solenoid 79 functions to retract the detent follower 77.

The solenoid 73 includes a spring loaded plunger 81 thereon, which has a ramp-shaped end. The chamfered shape of the OFF gate collar 71 and the ramp-shaped end on the spring loaded plunger 81 in the solenoid 73 create a positive stop to prevent unintended twist motion into the OFF position unless released electrically, but also allows a pilot to manually twist out of the spring-loaded OFF position.

In operation, the FMU 15 is normally controlled electronically by the EEC 17. For emergency operation, when the EEC is inoperative, the FMU is controlled mechanically from one of the twist grips 29 or 31. Each engine is normally operated by its own EEC as directed by its power management switch 43 or 45 on the console 41 between the two pilots' seats. Manual control of the engines is available through the twist grips 29 and 31, as noted above. This function is available if the EEC becomes inoperative, if for some reason the pilot desires to operate the engine manually, or, most importantly, to keep the pilot's hand always on the twist grips so he or she can respond with immediate power reduction in case the helicopter's directional control device suddenly becomes inoperative. When dual controls are installed, interconnected identical twist grips and switches are provided on both collective pitch sticks. Full engine control authority is available at each stick.

In case of an EEC failure or the assumption of manual control by the pilot, the EEC/FMU is designed to fail fixed, which means there is no immediate change in engine power after the EEC becomes inoperative. A mechanical input to the FMU, through the power lever 19 and the mechanical interconnection 21, by rotating one of the twist grips 29 or 31, gives the pilot full manual control from OFF to maximum power, in an emergency. Whenever the pilot selects manual control, whether or not the EEC has failed, the EEC is disabled. The engine's FMU incorporates rate restrictors to guard against engine surge in manual control.

The engine is started under EEC control by positioning the power management switch 43 or 45 in IDLE or FLY with the twist grips 29 and 31 in the normal (NORM) position This selects the ignition and starter ON. The EEC controls fuel-on at a certain percent gas turbine compressor (NG) speed during run-up (approximately 8% NG for the MD EXPLORER helicopter). At some predetermined NG speed at which the engine can accelerate by itself, the ignitor and starter are automatically deactivated (approximately 50% NG for the MD EXPLORER). When the EEC is operating properly, the pilot has no other powerplant management function throughout the flight, except to select the FLY position on the power management switch 43 and 45 if the engine was started in the IDLE position, until it is time to shut down the engine at the end of the flight by selecting OFF on the power management switch. If there is a need to cool the engine before stopping it, the engine may be dwelled at IDLE before selecting OFF.

To fly the aircraft, when the EEC 17 is operational, using the described controls in a pre-start procedure, a pilot or co-pilot first ensures that the collective twist grips 29 and 31 are in the NORM position for both engines 13 (absent an emergency or pilot option for manual control, the twist grips will remain in the NORM position throughout the flight regime), the engine power management switches 43 and 45 are OFF (both engines), the ignition switches 53 and 55 are OFF (both engines), the bleed air switches 57 and 59 are OFF, and the fuel crossfeed switch is OFF. Then, he or she may begin the procedure for starting the engines by first switching the Start/Enable switch 33 to the ON position. Following this step, the fuel boost pump switches (not shown) are switched ON for both engines. The next step is to switch the left engine power management switch 45 to the IDLE or FLY position (at the pilot's option, the right engine may be started first, rather than the left engine). At this point, the engine electronic control 17 starts the engine. The conventional generator control unit (not shown) turns off the starter and ignition at approximately 50% NG, and establishes IDLE rpm at about 65% NPT or FLY rpm at 100% NPT (100% is the nominal "FLY" engine speed, but particular operational conditions may require an actual speed adjusted to plus or minus 5% from this nominal condition), for the preferred embodiment. Finally, if the left engine power management switch 45 has previously been in the IDLE position, it is now switched to FLY, after which the EEC accelerates the engine to 100% NPT and is in full command of the engine. Now, the same procedures are followed for the other engine.

Once the engines have been started, the pilots should conduct an overspeed test procedure before flight, if the overspeed protection device is installed. To do this for the preferred embodiment, employing a P&WC 206A engine, both of the power management switches should be in the IDLE position, so that the EEC 17 controls the NPT at about 65% rpm. Then, the overspeed test switch 51 should be switched to the left engine position, at which time the pilot should observe the NPT increase to about 98% rpm, drop below 98%, and continue to cycle for about 10 seconds. At this point, the left engine power management switch 45 should be switched to FLY, and the overspeed test switch 51 should be switched to OFF. The NPT should then establish itself at 100%. This test is then repeated for the right engine, after which the helicopter is ready to fly. Other engines that may be installed may approach this function differently.

When the control systems are operating properly, no action is required to control the engines during flight; the EEC will maintain 100% NPT. However, if the EEC becomes inoperative, or some other flight emergency occurs which requires manual control of the engines by the pilots, the twist grips 29 or 31, as appropriate, are twisted out of the NORM detent and are rotated to modulate engine power on demand.

Both of the power management switches 43 and 45 have a TRAIN setting, which may be activated for one of the engines once both engine power management switches have been set to FLY, and the engines' NPT is 100%. When the selected engine's power management switch has been reset from FLY to TRAIN, the NPT governor will be reset to a lower limit for the selected engine (92% for the preferred embodiment). The NPT for the TRAIN engine is set low enough to stay below the rotor speed droop in normal flight, but high enough to supply power at an operationally safe rotational speed if the other engine fails. Also, the collective pitch "anticipation" circuit to the TRAIN engine, and torque matching circuits between the engines are disabled. Finally, when one engine is in the TRAIN mode, the EEC logic prevents the other engine from going into the TRAIN mode.

When one or both of the EEC's 17 for the engines 13 are inoperative prior to engine start-up, it becomes necessary to substantially modify the start-up procedure outlined supra. Assuming that one of the EEC units is still properly functioning, for prestart, the collective twist grips 29 or 31 should be set in the NORM position for the unimpaired engine and in the OFF position for the impaired engine. The power management switches 43 and 45 should be set to the OFF position for both engines. Then, to start the engines, the EEC operational procedure outlined supra should be followed to start the unimpaired engine. Then, to start the impaired engine, its twist grip 29 or 31 should be set to the low end of the manual range. The power management switch 43 or 45 should be set to IDLE. The engine will start to rotate and, at about 8% NG for the preferred embodiment, the twist grip should be used to modulate the engine exhaust gas temperature to start and accelerate the engine to the desired NPT. The airframe generator control unit will signal the starter and ignition to disengage at approximately 50% NG. The impaired engine power management switch should be set to either IDLE or FLY. The pilot may control the NPT at 100% using the twist grip controls.

Of course, should the EEC for both engines be inoperative, the impaired engine starting procedure should be utilized to start both engines.

To operate the inventive control system to restart one or both engines after flameout in flight, when the EEC 17 is operational, the twist grip 29 or 31 for the flamed-out engine should be in the NORM position. Then, that engine's power management switch 43 or 45 should be switched to the OFF position, then immediately switched back to the FLY position. This action causes normal ignition and spool-up to begin when the engine compressor turbine rpm (NG) falls to a predetermined percent rpm (8% in one preferred embodiment).

If the EEC for the flamed out engine is not operational, or if manual mode control is desired, the twist grip should be rotated to a position against the IDLE/STOP gate. Then the power management switch for the affected engine should be set to the OFF position until the NG falls below the predetermined percent rpm discussed supra. Then, the power management switch should be reset to FLY, and the twist grip should be controlled manually to accelerate the NPT to 100%.

The unique features of the inventive control system make the engine stopping procedure upon landing very simple. If the engine EEC is operational, the pilot merely switches the power management switches OFF for both engines. If one or more engines is impaired, such that the EEC is inoperative, the impaired engine collective twist grip is switched OFF, after which the impaired engine power management switch is turned OFF.

An additional feature of the invention is the ability to "motor" the engine with no fuel flow to the engine and no ignition. To accomplish same, the pilot or mechanic selects the twist grip OFF position and sets the power management switch to IDLE. This arrangement energizes the starter motor to spin the engine but keep the fuel supply OFF. The procedure is also useful for washing the engine or blowing out unburned fuel.

Although an exemplary embodiment of the invention has been shown and described, many changes, modifications, and substitutions may be made by one having ordinary skill in the art without necessarily departing from the spirit and scope of this invention.

What is claimed is:

1. An engine control system for a rotorcraft having at least one engine, the engine control system including an electronic engine control unit for each engine and further including a manually operated system for backing up each electronic engine control unit in the event of a failure thereof or for permitting optional manual engine operation, said engine control system comprising:
   at least one collective pitch stick;
   at least one twist grip rotatably mounted on said collective pitch stick, each said twist grip being rotatable through an operating arc from an idle stop to a maximum power position, the number of twist grips being equal to the number of engines and said twist grips being arranged to control a corresponding engine, each said twist grip further including a normal (NORM) position within the range of said operating arc which is coincident with a detent;
   said detent being spring-loaded, said system including means for electronically actuating the detent to retract when said twist grip is rotated out of the NORM position into a manual operating mode, such that the electronic disablement of said detent permits an operator to smoothly operate said twist grip through said operating arc when the engine control system is in a manual control mode.

2. The engine control system as recited in claim 1, including a reset control which, when actuated, electronically enables said detent, thereby permitting said twist grip to be rotated until falling into the detent to return said engine to automatic electronic control.

3. The engine control system as recited in claim 1, the means for electronically actuating said detent comprising a solenoid which is activated to disable the detent responsive to microswitches which sense twisting of the grip out of the NORM position in either direction.

4. The engine control system as recited in claim 1, wherein said engine is designed to fail fixed, such that there is no immediate change in engine power when said engine electronic control becomes inoperative.

5. The engine control system as recited in claim 1, wherein said engine control system includes a power management switch corresponding to each engine, and being mounted on a console for convenient pilot control, said power management switch having an OFF position, an IDLE position, and a FLY position, and being adapted for operation in coordination with said twist grip.

6. The engine control system as recited in claim 1, wherein each said twist grip has an additional arc of travel past said idle stop to an OFF position, wherein fuel flow to its corresponding engine is cut off.

7. The engine control system as recited in claim 6, wherein said system includes an electrically actuated mechanical gate over which said twist grip must pass to enter or exit said OFF position.

8. The engine control system as recited in claim 7, wherein said gate is normally biased closed, and may be opened electrically by means of a pilot-actuated off release pushbutton to enter said OFF position, or may be opened mechanically by twisting said twist grip against said bias to exit said OFF position.

9. The engine control system as recited in claim 1, including a means interconnecting said at least one collective pitch stick to said electronic engine control unit to introduce an anticipation signal for preparing the engine for an imminent change of power due to changing collective pitch.

10. An engine control system for a rotorcraft having at least one engine, the engine control system including an electronic engine control unit for each engine and further including a manually operated system for backing up each electronic engine control unit in the event of a failure thereof or for permitting optional manual engine operation, said engine control system comprising:

at least one collective pitch stick;

at least one twist grip rotatably mounted on said collective pitch stick, each said twist grip being rotatable through an operating arc from an idle stop to a maximum power position, the number of twist grips being equal to the number of engines and said twist grips being arranged to control a corresponding engine, each said twist grip further including an additional arc of travel past said idle stop to an OFF position, wherein fuel flow to its corresponding engine is cut off, said system including an electrically actuated mechanical gate over which said twist grip must pass to enter or exit said OFF position.

11. The engine control system as recited in claim 10, wherein said gate is normally biased closed, and may be opened electrically by means of a pilot-actuated off release pushbutton to enter said OFF position, or may be opened mechanically by twisting said twist grip against said bias to exit said OFF position.

12. The engine control system as recited in claim 10, including a means interconnecting said at least one collective pitch stick to said electronic engine control unit to introduce an anticipation signal for preparing the engine for an imminent change of power due to changing collective pitch.

* * * * *